March 25, 1969 — F. B. K. GREEN — 3,434,920
APPARATUS FOR CONTINUOUS DIGESTING
Filed Oct. 7, 1965

INVENTOR:
FRANK B. K. GREEN

INVENTOR:
FRANK B. K. GREEN

March 25, 1969 F. B. K. GREEN 3,434,920
APPARATUS FOR CONTINUOUS DIGESTING
Filed Oct. 7, 1965 Sheet 3 of 9

INVENTOR:
FRANK B. K. GREEN
BY
Dawson, Tilton, Fallon, Lungmus & Alexander
ATT'YS

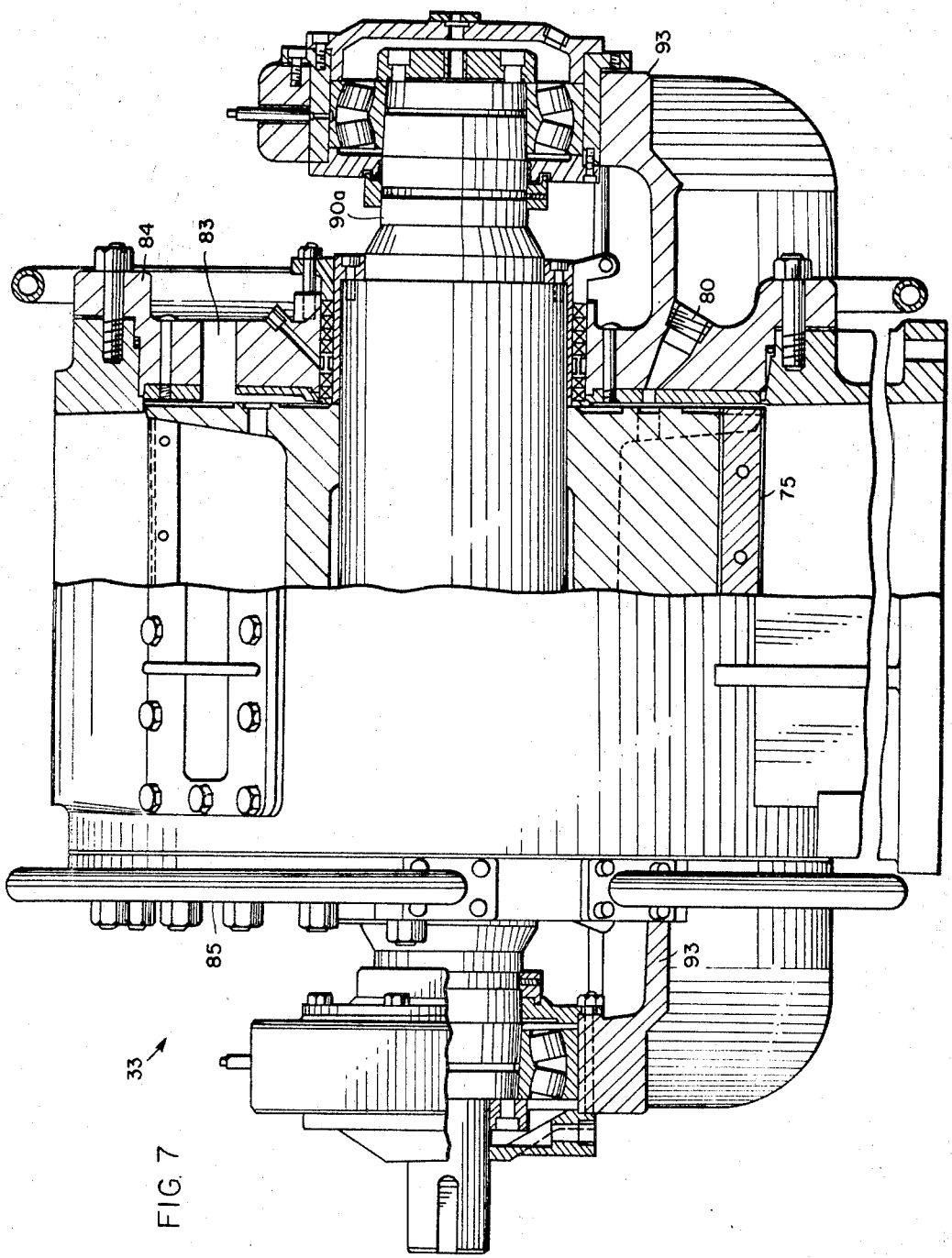

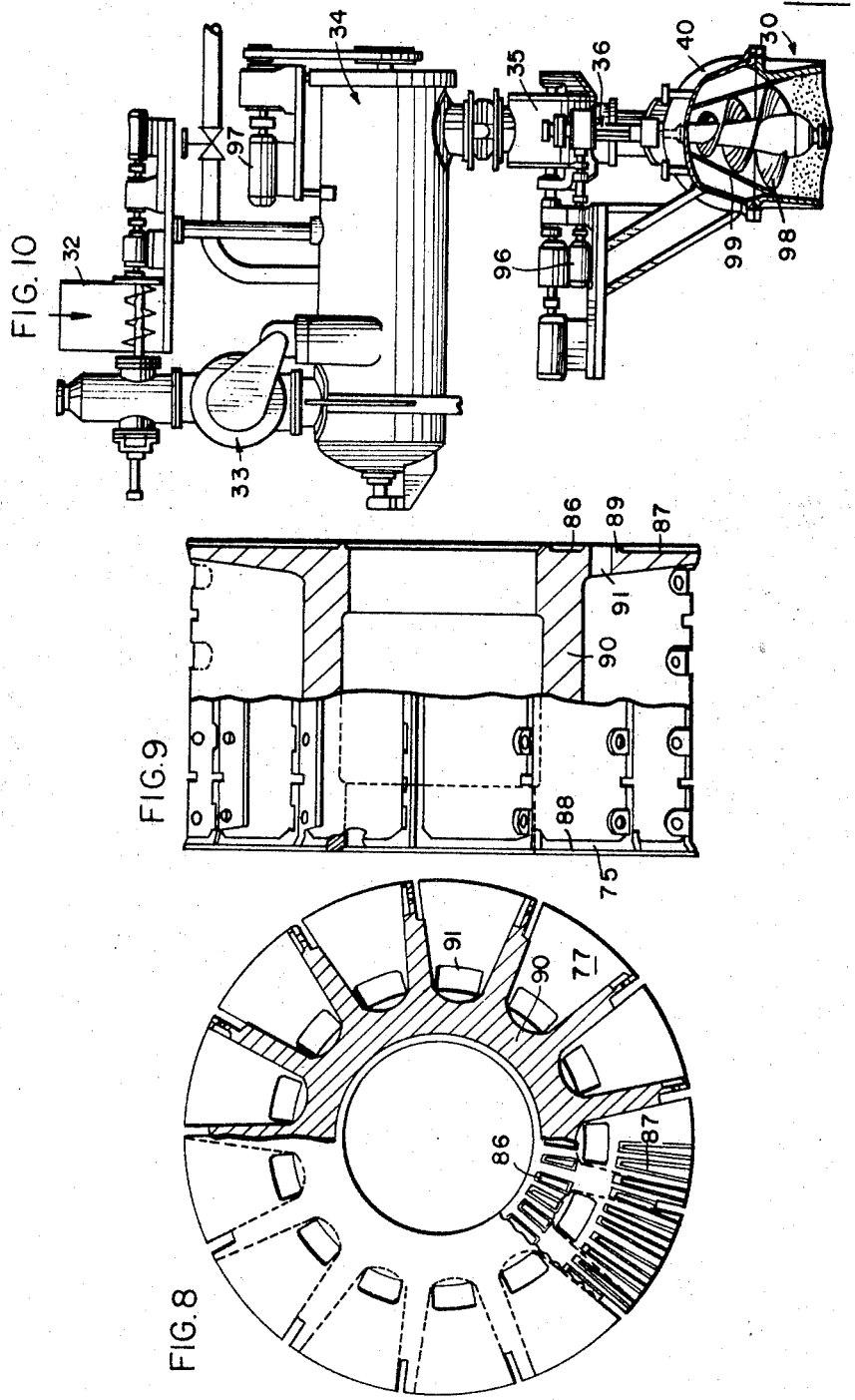

INVENTOR:
FRANK B. K. GREEN

March 25, 1969　　　F. B. K. GREEN　　　3,434,920
APPARATUS FOR CONTINUOUS DIGESTING
Filed Oct. 7, 1965　　　　　　　　　Sheet 8 of 9

INVENTOR:
FRANK B.K. GREEN
BY
Dawson, Tilton, Fallon, Lungmus & Alexander
ATTY'S

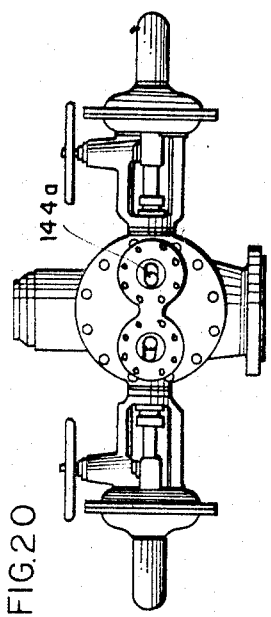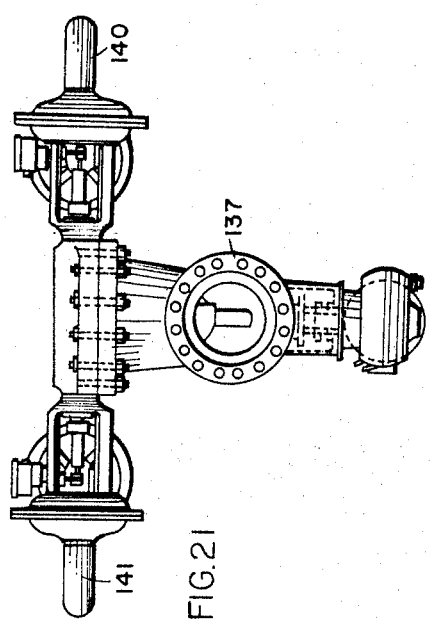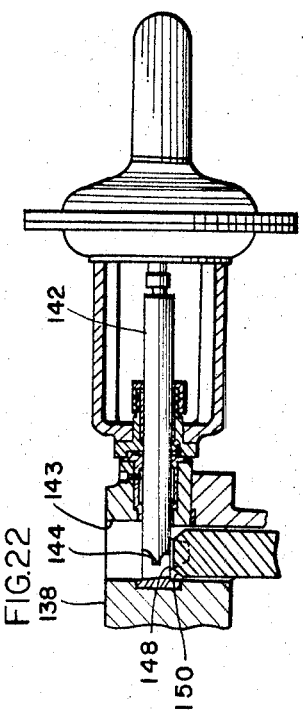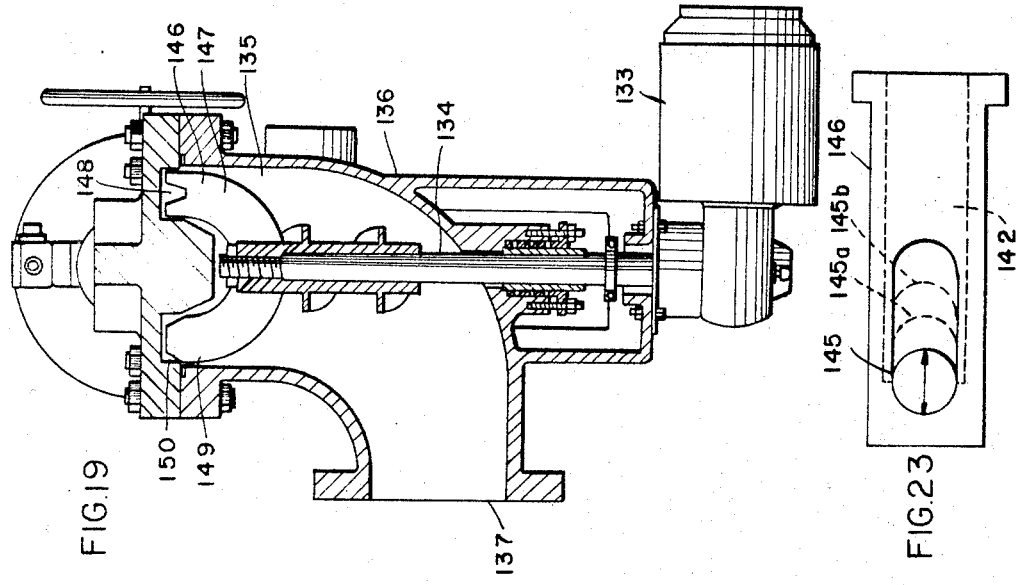

United States Patent Office 3,434,920
Patented Mar. 25, 1969

3,434,920
APPARATUS FOR CONTINUOUS DIGESTING
Frank B. K. Green, 10835 SW. Muirwood Drive,
Portland, Oreg. 97225
Filed Oct. 7, 1965, Ser. No. 493,800
Int. Cl. D21c 7/12, 7/08
U.S. Cl. 162—237                    8 Claims

ABSTRACT OF THE DISCLOSURE

A vertical digester having a presteamer and rotary feeder coupled to the top of the digester chamber. The top is equipped with a submergence screw which takes the chips through a high-pressure steam zone after which an adjustable level of liquor is encountered, defining the top of an impregnation zone of lower temperature through which the chips pass. Below the impregnation zone is a heating zone, the top of which is defined by a plurality of vertically extending pipes discharging heated liquor from strainers which are positioned at the lower edge of the heating zone. Below the heating zone is a retention zone and at the bottom of the chamber is a cooling and dilution zone, cooling liquid being introduced into this zone which additionally defines the top liquor level. The strainers employed are fluid purged and mechanically scraped.

BACKGROUND AND SUMMARY OF INVENTION

The conversion from vertical batch digesters to continuous vertical digesters has not proceeded with the speed expected. This stemmed from the fact that the vertical digesters available could not provide a uniform product at high efficiency.

This problem has been met and solved by the invention, and the provision of apparatus and method for this purpose constitutes an important object of the invention.

More specifically, the invention provides means and procedures for making various adjustments within a vertical digester quickly and accurately so as to produce a product of substantially unvarying quality notwithstanding changes in the character of the reactant wood chips. A more specific object is to provide a vertical digester and method wherein the usual "sawdust" accompanying the chips can be digested.

In the past, the sawdust chips (those able to pass a quarter-inch mesh screen) had to be removed because these small particles of wood would eventually plug the strainers through which the circulating liquor is withdrawn from the digester. As the plugging progresses, the amount of circulating liquor is reduced and, consequently, the amount of heat which can be added to the digester in the cooking zone is also reduced because there is not enough liquor available to absorb the heat under normal mill conditions. For lack of a better disposal, this sawdust is sometimes burned. When it is appreciated that these may constitute 1% to 2% of the wood purchased at a cost of $20.00 per ton in some areas, it is seen that this can represent a loss of $400.00 per day in a 1000-ton-per-day pulp mill. This loss is avoided by the practice of the invention, particularly through novel feeding and strainer design that do not plug.

Another factor contributing to the efficiency of operation of a digester is the power required. By virtue of the construction and arrangement of the various coacting parts in the inventive digester, the mechanical horsepower imput and steam demand in general is minimal in terms of the results obtained—the provision of apparatus for achieving this desired end constitutes another object of the invention. Other objects and advantages, both general and specific, may be seen in the details of construction and operation of the invention as set down in the ensuing portion of the specification.

The invention is described in conjunction with the accompanying drawing, in which—

Figure 1:
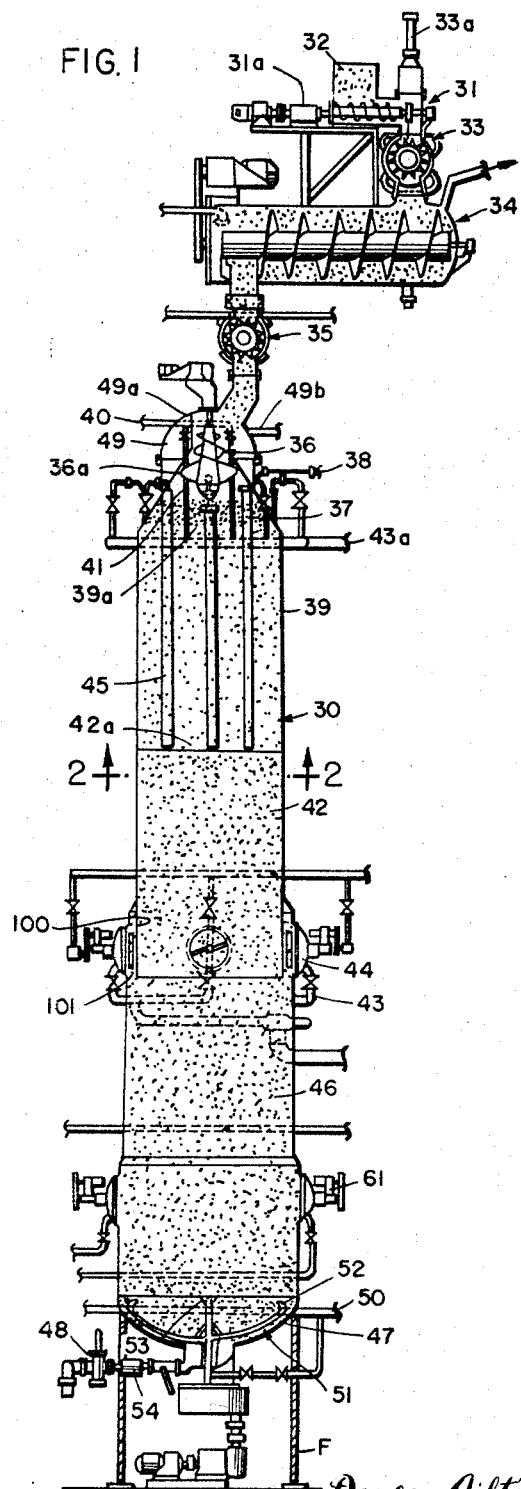
Figure 3:
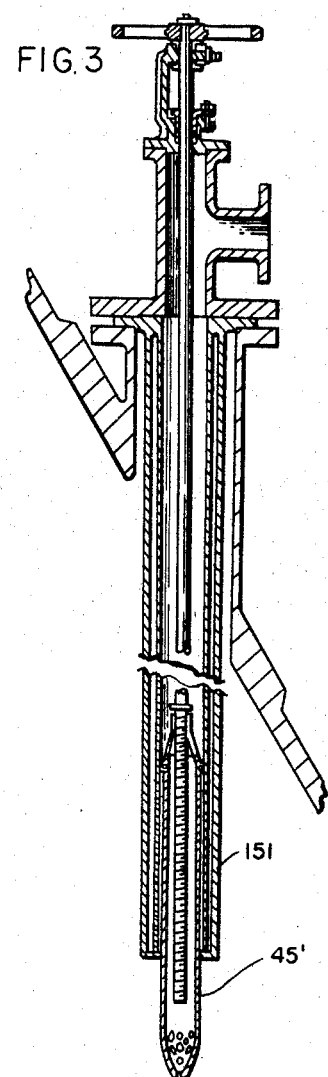
Figure 2:
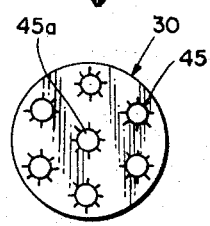
Figure 4:
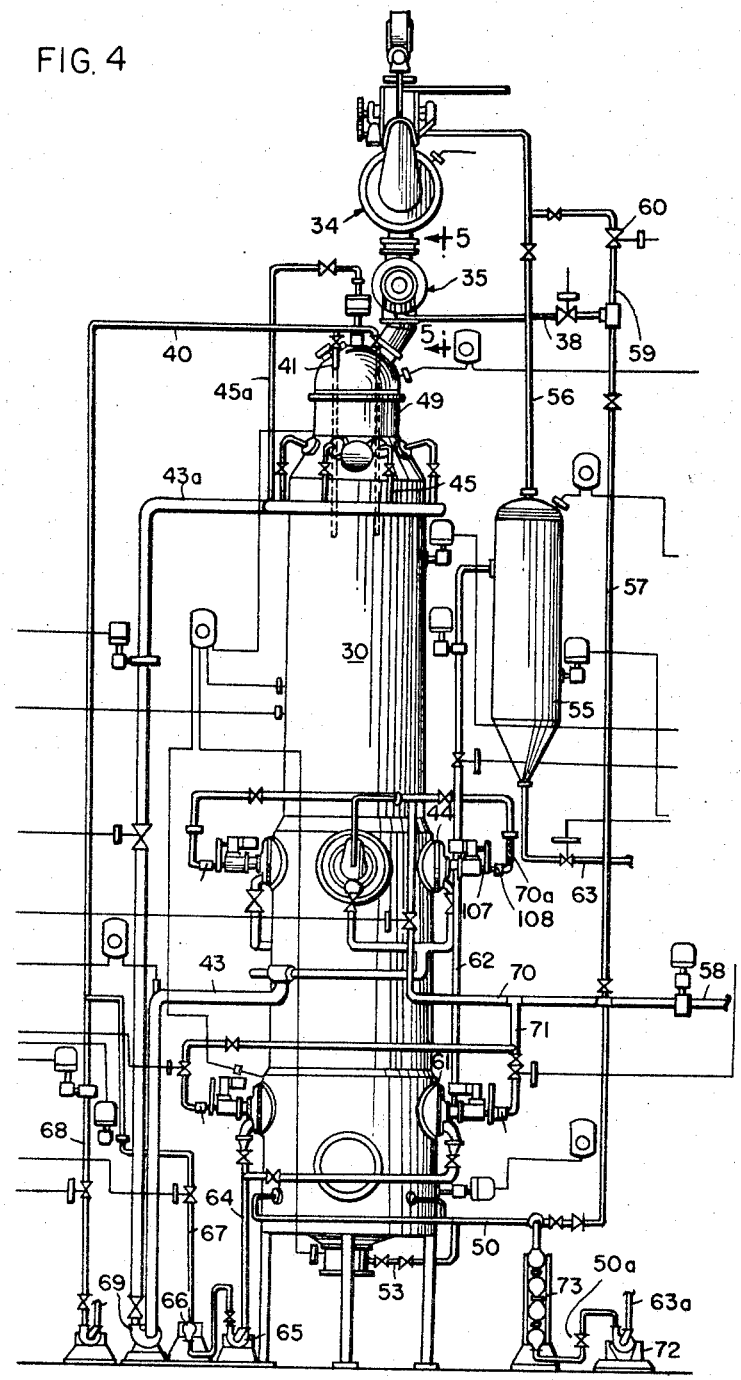
Figure 6:
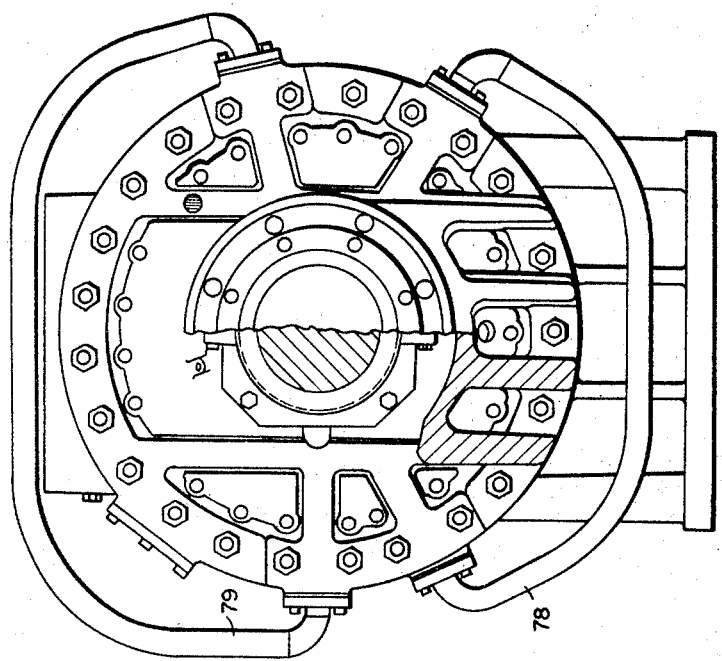
Figure 5:
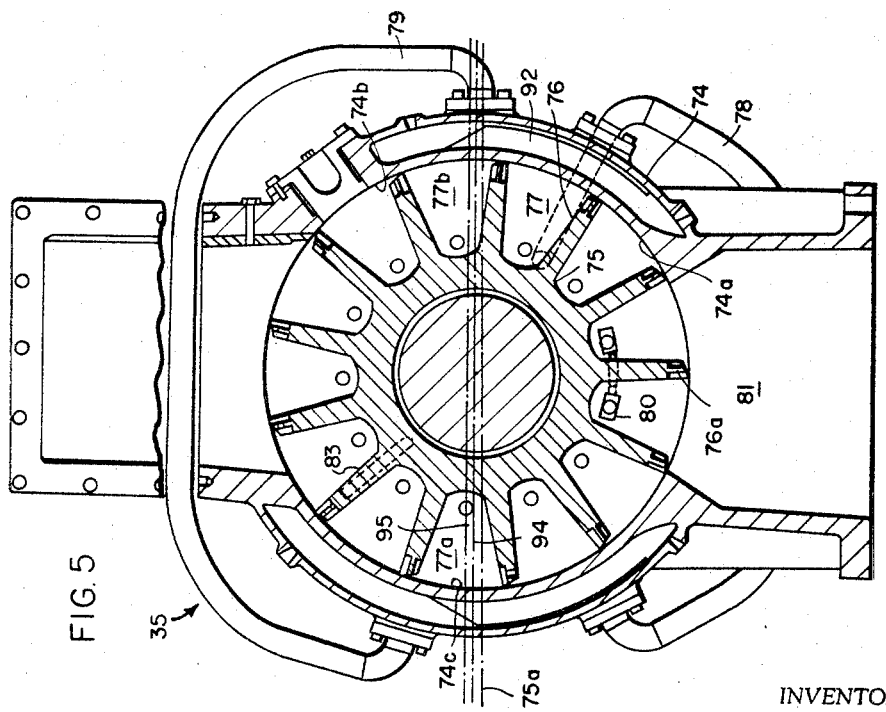
Figure 11:
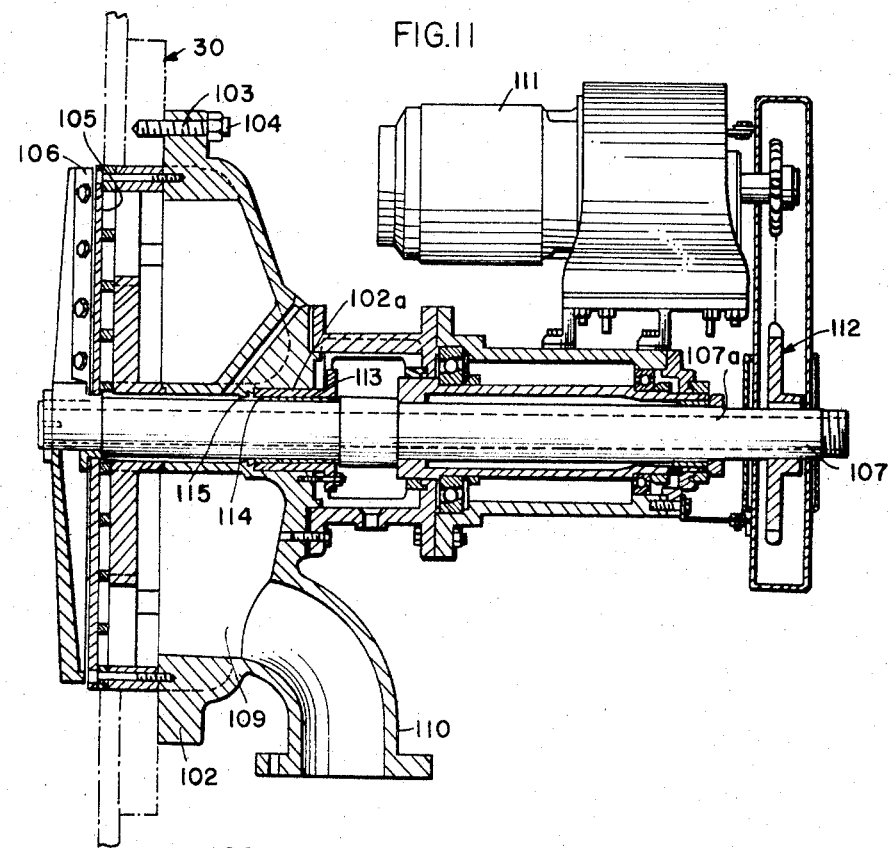
Figure 12:
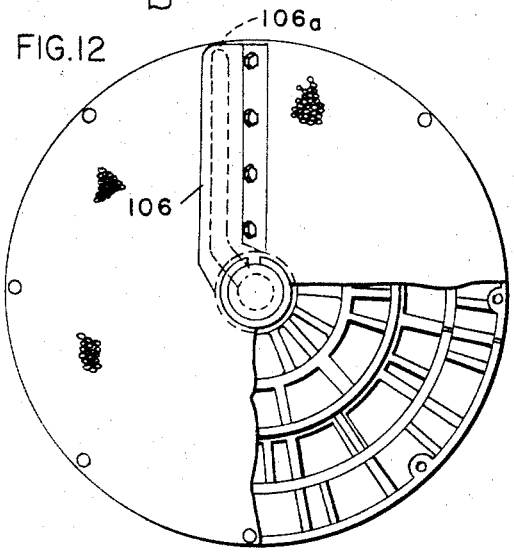
Figure 13:
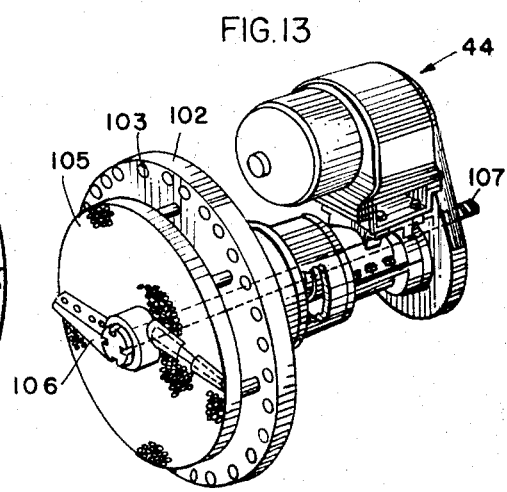
Figure 15:
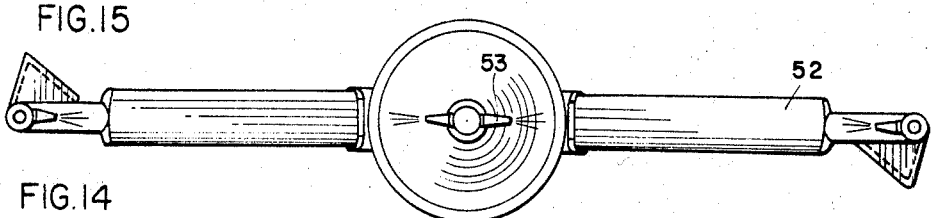
Figure 14:
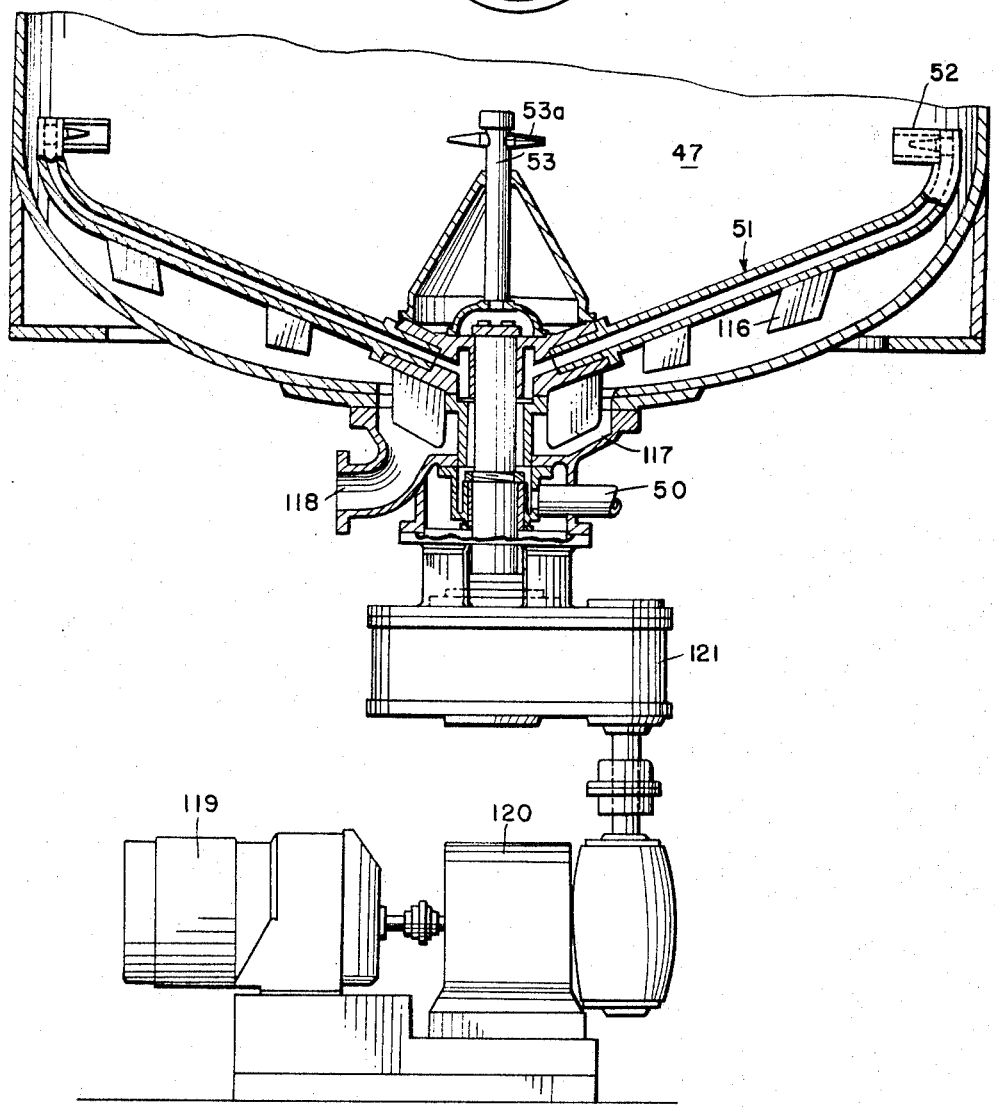
Figure 16:
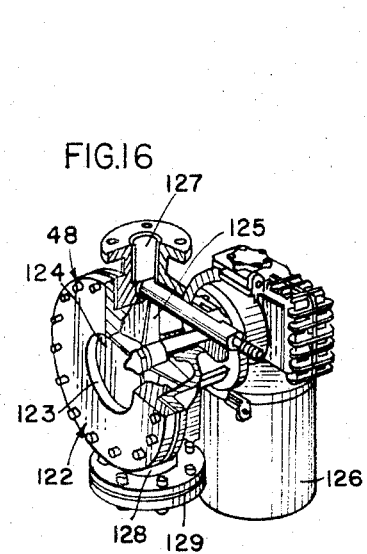
Figure 18:
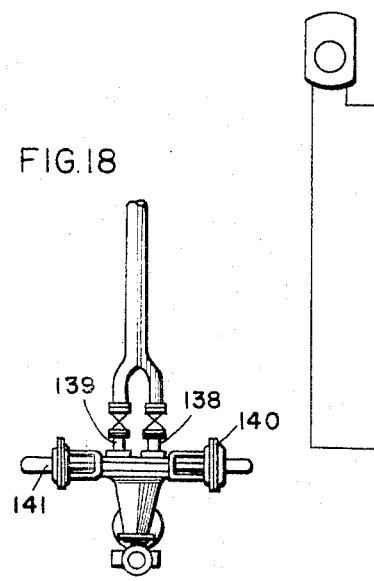
Figure 17:
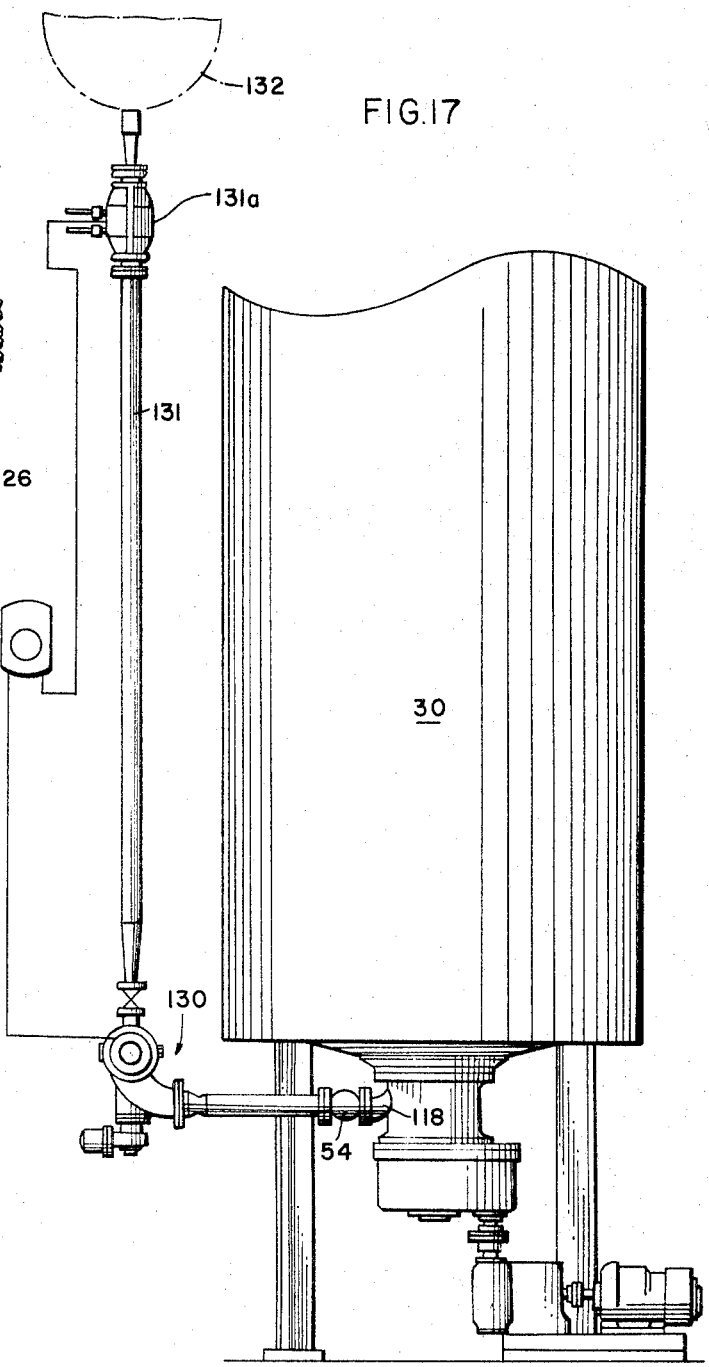

FIG. 1 is an elevational view, generally in vertical section, of a vertical digester embodying teachings of this invention; FIG. 2 is a transverse section taken along the line 2—2 of FIG. 1; FIG. 3 is a longitudinal sectional view of a modified form of circulation liquor feed pipe;

FIG. 4 is an elevational view of the inventive digester with the piping associated therewith;

FIGS. 5–9 relate to a rotary feeder valve found at the top of the digester pictured in FIG. 1 and wherein FIG. 5 is a vertical sectional view through the rotary feeder; FIG. 6 is an end elevational view partially in section; FIG. 7 is a side elevational view, partially in section of the rotary feeder; FIG. 8 is an end elevational view of the rotor portion of the rotary feeder; FIG. 9 is a side elevational view of the rotor portion, partially in section, of the rotary feeder;

FIG. 10 is a fragmentary, elevational view of the top portion of FIG. 1 showing the mechanical power connections to the two rotary feeders;

FIGS. 11–13 relate to the strainer or liquor removal mechanism and wherein FIG. 13 is a perspective view of this mechanism; FIG. 12 is an end elevational view partially in section, of the strainer; and FIG. 11 is a side elevational view partially in section;

FIGS. 14 and 15 relate to the bottom portion of the digester and, more particularly, to the removal plow and wherein FIG. 14 is an elevational view partially in section of the bottom portion of the digester; and FIG. 15 is a top plan view of the removal plow;

FIG. 16 is a fragmentary perspective view partially broken away of the type of blow valve found adjacent the lower lefthand portion of the digester of FIG. 1;

FIGS. 17–23 relate to a modified type of blow valve from that seen in FIG. 16 and wherein FIG. 17 is a fragmentary front elevational view of the lower portion of a vertical digester; FIG. 18 is a fragmentary side elevational view of the blow valve of FIG. 17; FIG. 19 is an enlarged sectional view of the valve seen in FIG. 17; FIG. 20 is a top plan view of the aforesaid valve; FIG. 21 is a side elevational view of the aforesaid valve; FIG. 22 is a horizontal sectional view of the valve; and FIG. 23 is an enlarged view of the orifice developed by the valve as seen in FIG. 20.

In the illustration given, and with particular reference to FIG. 1, the portions of the inventive vertical digester that deal with the wood chips and pulp are shown (the piping details being substantially omitted, these being seen in detail in FIG. 4). In FIG. 1, the numeral 30 designates generally the digester proper which is seen to be a vertically elongated chamber arranged to receive wood chips at the top and discharge digested pulp at the bottom.

To introduce the chips at the top, a metering screw mechanism generally designated 31 is employed which is equipped with an inlet as at 32 communicating with a wood chip source (not shown). The chips from the metering screw mechanism are discharged into a low pressure rotary feeder valve generally designated 33 and this, in turn, forces the chips into a lower pressure presteamer generally designated 34. From the presteamer 34, the chips move into a high pressure rotary feeder valve generally designated 35. The bottom outlet of the feeder valve mechanism 35 is coupled to the top portion of the digester 30 wherein the chips encounter a chip submergence screw mechanism generally designated 36. As the wood chip leave the bottom end of the submergence screw mechanism, they are subjected to steaming in a zone designated 37. All the steam for presteaming is advantageously introduced through the high pressure feeder valve 35 where it is employed to purge chips from the pockets whereby the same steam performs a dual function. Also, for this purpose, high pressure steam may be introduced by line 38.

The next stage in the digester 30 is a liquor impregnation zone 39—this being achieved by virtue of introducing white liquor, black liquor, or a combination of white liquor and black liquor through supply manifold 40. The manifold 40 serves a header for a plurality of axially extending discharge pipes 41 which are seen to terminate, i.e., have their lower discharge ends positioned, slightly below the upper level of the zone 39.

After passing through the liquor impregnation zone 39, the chips encounter the upper portion of the cooking zone (the liquor circulation zone), which is designated by the numeral 42. For cooking in this one, liquor is recirculated from the header 43 communicating with strainers 44 and delivered to supply pipe 43a to a plurality of axially extending discharge pipes 45 (the arrangement being seen in FIG. 2). A modified form of adjustable circulation liquor supply pipe is seen in FIG. 3 and designated 45′.

Following the passage of chips through the liquor circulation portion of the cooking zone, the chips then pass through the remainder of the cooking zone which is designated 46, i.e., the portion below the strainers 44. Here, there is no recirculation of cooking liquor. Ultimately, the chips reach the lower portion of the digester where they pass through a cooling zone 47. From the zone 47, the chips are withdrawn by means of a blow valve 48 from which they are delivered to means (not shown) for further processing. It is believed that the details of construction of the digester and associated parts will be better understood from a brief description of the operation of the digester on wood chips introduced as at 32 and for that purpose the following generalized description is set down.

GENERALIZED DESCRIPTION

Two presteaming stages are provided. The first stage is provided by the presteamer 34 in a horizontal tube above the digester 30. The various framing members and other supports have been omitted for the sake of clarity although various pedestals and supports as at F (see the extreme lower portion of FIG. 1) are provided. The presteaming at 34 advantageously may be achieved at approximately 250° F., steam. For this purpose, flash steam is obtained from high temperature black liquor removed from the digester at the end of the cooking zone. I have found that the use of flash steam can reduce the overall steam consumption approximately 17%. Presteaming, as contemplated herein, conditions the wood chips for faster liquid impregnation. Air inside the chips can impede liquor impregnation, while presteaming compressed this air and tends to purge it from the chips. Further, presteaming adds moisture to the chips which helps liquor impregnation, the chips with higher moisture content being more receptive to liquor. Air surrounding the chips fed into the low pressure presteamer is displaced by the steam and purged from the system through the low pressure rotary feeder valve 33 and the relief line 33a.

The second stage of presteaming takes place in the dome portion 49 of the digester 30. The steaming zone 37 previously referred to is at full digester temperature, as high as 370° F. I find that since this temperature is extremely high, the retention time for chips in the zone 37 should be ordinarily of the order of two minutes or less. The zone 37 can be seen to occupy the space between the bottom flight 36a of the chip submergence mechanism and the liquor level 39a in the digester 30. The retention time in the high temperature steaming zone can be varied from zero to the desired time by adjusting the liquor level as at 39a. In addition to greater air displacement and higher chip moisture, high temperature presteaming is beneficial because the chips are hotter than the liquor in which they are eventually submerged. Any steam which may be inside the chips when the chips are submerged is condensed and causes the chips to soak up liquor faster. The vapor space as at 49a within the dome 49 is a collection point for air and volatiles which are continuously relieved from the digester. Provision is made as at 49b for the removal of these noncondensibles, i.e., air, turpentine, etc.

The liquor impregnation zone extends from the level 39a down to the bottom of the circulating liquor return pipes 45 where hot circulating liquor enters the digester to bring the charge up to cooking temperature. The temperature in the impregnation zone 39 is approximately 250° F., resulting from the mixture of hot chips and condensate with the comparatively cool white liquor introduced through the manifold 40 and discharge pipes 41. The retention time in this zone is somewhat dependent upon the character of the chip. For example, for ⅝″ chips, I prefer a retention time of approximately 15 minutes, but shorter chips can use a proportionately less time. White liquor, black liquor or a mixture of white liquor and black liquor is continuously added to the top of the zone 39 through a second plurality of perforated supply pipes 41 which are advantageously disposed across the cross-section of the digester 30. The impregnation liquor enters the liquor pool well below the top surface 39a to prevent the same from being heated by steam in the digester dome 49. No provision is made in the illustrated embodiment for circulation of the liquor in the impregnation zone 39. The downward flow of the impregnation liquor with the chips is positive because the digester liquor level 39a is controlled.

The upper portion of the cooking zone has been referred to as the liquor circulation zone and has been designated 42. Circulating liquor at cooking temperature is withdrawn from the digester through the strainers 44 and collection header 43 returned to the top of the cooking zone through the supply manifold 43a and the discharge pipes 45. Incident to withdrawal of liquor, it may be heated directly by introduction of steam as will be described in detail relative to FIG. 11 or indirectly or a combination of both forms. Chips and liquor moving down from the impregnation zone 39 are brought up to cooking temperatures when they enter the top of the cooking zone as at 42a. The temperature of the cooking zone may range from 340° to 360° F., depending upon mill conditions. The retention time of chips in the circulation zone 42 is approximately 30 minutes. This permits several liquor turnovers in the time required for the chips to pass through the zone. High circulation and even liquor distribution give a fast rise to cooking temperature and assure even liquor concentration throughout. The bottom of the cooking zone as at 46 does not have liquor circulation. In this zone, the liquor and chips move downwardly together because of the automatically controlled flow of pulp leaving the bottom of the digester. Retention time in this zone will vary from 1 to 2½ hours, depending upon the cooking required. The cooking zone ends near the bottom of the digester where cooling liquor is added as at 50 to reduce the blowing temperature to about 220° F. The cooling liquor addition is controlled by a liquid-level controller to maintain a constant liquor level in the digester at 39 and is independent of the liquor and pulp leaving the digester under normal operating conditions.

As mentioned previously, the lowest segment of the digester contains a cooling zone 47. In this zone, a plow generally designated 51 turns to move the cooked pulp toward the axis of the digester for discharge. Nozzles for the introduction of cooling liquor are mounted on the plow arms and on a central standpipe as at 52 and 53, respectively, for the introduction of cooling liquor. This results in cooling the pulp uniformly and gives a uniform pulp consistency.

The retention times and temperatures in all zones are adjustable and changeable during operation. Retention time in both presteaming zones is also adjustable during operation. Retention time in the liquor impregnating zone can be changed by changing the length of the liquor return pipes 45'. Changing the retention time in the liquor impregnation zone changes the time in the cooking zone. The production rate, which determines the cooking time, is controlled by the automatic blow valve 48 operated through a flow meter 54. The controlled flow rate of pulp from the digester, together with automatic control of the chip feed to the digester to keep it completely filled at all times, assures a constant cooking time.

Digester piping

Reference is now made to FIG. 4 which shows the digester chamber 30 previously described in combination with the various pipes utilized for conducting fluids to the various zones. Reference was previously made to the flash steam introduced to the discharge of the low pressure rotary feeder 33 or presteamer 34. This steam which may be at 15–20 p.s.i. (about 250° F.) is developed in a flash tank 55 (see the righthand central portion of FIG. 4) and is delivered through a line 56 to the presteamer 34. A high pressure steam branch line 57 coming from the large steam main 58 (see the lower righthand portion of FIG. 4) not only delivers steam via the line 38 to the discharge of the high pressure rotary feeder valve 35 or dome section 49 of the digester 30, but is equipped with a further branch line 59 for low pressure steam to be delivered to the line 56 upon startup. For that purpose, a pressure reducing valve 60 is mounted in the line 59. The steam is delivered to the rotary valve 33 and thus, in addition to purging the valve pockets, also supplies the presteamer 34.

The flash steam in the tank 55 is developed from black liquor removed from the digester by lower strainers as at 61 and is caused to flow through a pipe 62 to the flash tank 55. The remaining liquid in the tank 55 is removed through a discharge line 63 to an intermediate black liquor tank (not shown).

A portion of the black liquor removed from the lower strainers 61 flows through line 64 to the black liquor pump 65 (see the lower lefthand portion of FIG. 4), then to a heat exchange 66 and pipe 67 for union with white liquor flowing in pipe 68. The combined streams flow through manifold 40 (see the upper lefthand portion of FIG. 4) into the supply pipes 41. The supply pipes 41 provide the impregnation liquor previously referred to which develops the zone 39.

For developing the recirculation liquor portion of the cooking zone, i.e., the zone 42, recirculation liquor is removed from the upper strainers 44 through the pipe 43 and after passing through the pump 69 (see the lower lefthand portion of FIG. 4) flows through the supply manifold 43a to the recirculation supply pipes 45. As can be seen from FIG. 2, these pipes 45 are spaced throughout the cross-section of the digester proper so as to achieve uniform liquor conditions. Additionally, a branch line 45a is installed on the axis of the digester 30 so as to further achieve uniformity of distribution of the circulating liquor.

The strainers 44 utilize high pressure steam or liquor or a mixture thereof for both cleaning and heating. High pressure steam or liquor or a mixture thereof is also delivered to the lower strainers 61 via the branch line 71 (see the lower righthand portion of FIG. 4).

The lowermost zone, i.e., the cooling zone 47, is developed by introducing cooled black liquor from the line 63a (see the lower righthand portion of FIG. 4) which flows through a pump 72 and heat exchanger 73 before entering the pipe 50. By regulating the flow of cooling liquor via valve 50a (see FIG. 4) the upper level 39a is controlled. The black liquor from the flash tank 55 is used to cool the bottom zone of the digester and any pulp which may have escaped through the bottom screens with the black liquor is returned to the digester, thereby eliminating the need for supplemental screening of the fibers from the black liquor.

The following example sets down typical operating conditions and values for the various operational portions of the digester just described.

EXAMPLE

In this example, the digester capacity was 225 air dried tons of pine or aspen per day which when oven dried had a weight of 10 pounds per cubic foot. This also was the weight of chips in the impregnation zone and the average weight of chips in the cooking zone was 15 pounds per cubic foot. For this, it was necessary to feed 38,333 pounds of oven dried chips per hour to the digester. The moisture content of the chips was 40% which gave a weight of water in the chips of 25,555 pounds per hour. The temperature of the chips in storage was 80° F., and the temperature of the chips in the presteamer was 250° F. The retention time of the chips in the presteamer was 2 minutes and the temperature of the chips in the dome of the digester was 300° F. The retention time of the chips in the dome of the digester was 3 minutes.

The temperature of the impregnation zone 39 was 248° F., with a retention time of 20 minutes. The temperature in the cooking zone was 345° F., and the retention time was 60 minutes. To develop cooking, the active alkali ($Na_2O$) required was 16% and the concentration of the alkali in the liquor was 6 pounds per cubic foot. The white liquor feed rate to the digester was 70,022 pounds per hour representing 128 gallons per minute. The temperature of the white liquor in storage was 180° F., while the temperature of the circulating liquor was 365° F., at a rate of 1,297 g.p.m.

The pressure in the steam main was 170 p.s.i. yielding 365° F., steam temperature in the dome of the digester at 150 p.s.i. The steam pressure in the presteamer 34 was 15 p.s.i., and 6,873 pounds per hour of steam was required to presteam the wood in the presteamer and 2,630 pounds per hour of steam was required to presteam the wood in the dome of the digester. 14,871 pounds per hour of steam was required to heat the circulating liquor. Sufficient black liquor was removed at the bottom of the digester to develop 3,998 pounds per hour of flash steam to the presteamer tube. The net steam consumption per ton of pulp was 2,362 pounds per ton.

The black liquor delivered to the flash tank 55 was 46,643 pounds per hour and of this, 42,645 pounds per hour was returned to intermediate storage. The temperature of the blown pulp was 220° F., while the temperature of the cooled black liquid fed to the bottom of the digester was 150° F., at 330 gallons per minute. For this, 137,799 pounds per hour of black liquor makeup for main storage was required.

Cooling water was also required in the amount of 99 g.p.m. with a temperature at the inlet of 60° F., and a temperature at the outlet of the heat exchangers of 160° F.

The consistency of the blown pulp was 5.9% and the percent of solids in the black liquor to the blow tank was 19.5% representing 3,499 pounds of solids per ton of pulp to the evaporator (see FIG. 17 at 132).

The rotary feeder valve mechanism previously referred to in connection with the upper portion of FIG. 1 will now be described in detail and with particular reference to FIGS. 5–9.

Rotary feeders

In FIG. 5, a rotary feeder valve 35 is seen in partial section and which is generally of the form disclosed in my prior patent, No. 2,933,208. In FIG. 5, a generally cylindrical outer casing 74 is seen to provide a mounting for a rotor 75. The rotor 75 has a plurality of radially extending vanes 76 which define pockets 77 for conducting predetermined quantities of wood chips either from the metering screw mechanism 31 to the presteamer 34 or from the presteamer 34 to the chip submergence screw mechanism 36. In my previous patent, I described various crossover pipes 78 and 79 which communicated pockets on opposite sides of the rotor for the purpose of effecting a gradual reduction in steam pressure. The steam pressure at the inlet of the high pressure rotary feeder 35 is ordinarily of the order of 15 p.s.i. The pressure in the dome 40 of the digester 30 is ordinarily of the order of 150 p.s.i. To introduce chips into the dome, purge steam of the order of 160 p.s.i. is introduced into the bottom pockets as at 80 (see also FIG. 7). Thus, a pocket leaving the discharge 81 of the housing 74 would ordinarily contain 150 p.s.i. steam. By communicating this pocket with a counterpart pocket approaching the discharge 81, the pressure can be reduced approximately 50%—via the coupling conduit 78. In like fashion, the coupling conduit 79 again reduces the pressure 50%, i.e., to the order of about 40 p.s.i. by communicating a pocket 77a with a pocket 77b. In some instances, however, it may be advantageous to avoid the crossover pipe 78 and 79; instead injecting cooling water so as to reduce the pressure of the empty pockets returning to the inlet 82 of the housing 74. To further reduce the pressure in the pockets and purge the labyrinths approaching the inlet 82, I provide an exhaust slot 83 (see also FIG. 7) in the end covers 84 and 85 of the housing 74. The slots 83 are seen to be relatively elongated in a radial direction and thus overlap the radially spaced recesses 86 and 87 (see FIG. 8), which in effect define labyrinthine passages in the end faces 88 and 89 of rotor 75 (see FIG. 9). In other words, the rotor 75 has a hub portion 90 equipped with the integral vanes 76 and end bells or closures 88 and 89 (see FIG. 9). The interior of each pocket 77 (still referring to FIGS. 8 and 9) is communicated with the end face of each cover 88 by means of a plurality of rectangular openings as at 91. Thus, any sawdust in the labyrinth recesses 86 and 87 at the time of passing the exhaust slot 83 is purged from the labyrinthine passages and in the case of the high pressure rotary feeder 35, returned to the low pressure presteamer 34 whereas with the low pressure rotary feeder 33, it is returned to a cyclone section above the valve 33. However, during the portion of travel of a given pocket in approaching and leaving the discharge 81, any entrapped smaller chips, i.e., sawdust, serve to advantageously seal the rotor and casing against bypass of steam from one pocket to the next. Once the pocket 77 reaches the position over the discharge 81, steam entering the relatively elongated supply port 80 quickly purges the pockets of chips.

In FIG. 5, it will be seen that the casing 74 is shaped to provide a steam jacket 92 into which high pressure steam, i.e., of the order of 365° F., is introduced so as to maintain the high pressure rotary feeder valve 35 at a substantially uniform temperature and thereby avoid the differences in expansion of the various parts. In the case of the feeder valve 35, the entering chips have a temperature of the order of 250° F., while the bottom of the feeder valve is subjected to the 365° F. Aiding in eliminating differential expansion of the various parts of the feeder valve is the provision of single pedestals as at 93 on each end of the housing 74 (see FIG. 7), the pedestals 93 being for the purpose of supporting the end shafts 90a of the rotor 75.

In order to further minimize clearances between the rotor 75 and housing 74 and thereby achieve greater efficiency in the transfer of steam-pressured wood chips, I construct the casing 74 to provide an obround interior. This can be appreciated from a consideration of FIG. 5. The centerline designated 94 corresponds to the centerline of the lower hemicylindrical portion of the casing 74, more properly the hollow interior defined by wall 74a of the casing 74. The upper centerline 95 defines the center of the upper hemicylindrical wall 74b of the housing 74. Thus, there is a relatively small straight wall section as at 74c kept in the upper and lower hemicylindrical walls so as to make up the above mentioned "obround" configuration.

The centerline 75a of the rotor 75 is about .005" to .006" below centerline 94 of the lower hemicylindrical portion of the casing 74. The combination of the obround body, together with the rotor 75 being set .005" to .006" below the centerline 94 yields the closest possible running clearance. The steam pressure in portion 81 of FIG. 5 is so high that it actually lifts the rotor 75 to the extent of the clearances in the bearings plus slight deflections of the bearing brackets and shafts, etc.

With this arrangement, I set the adjustable knives 76a on the vanes 76 so that a clearance between the knife tips and the upper hemicylindrical portion of the casing 74, at a point near the centerline is .007". This clearance is such that the tip of the blade 76a will touch the bottom hemicylindrical section at each side of outlet opening 81 when the valve is cold and at atmospheric pressure. When the valve is heated and at thorough working pressure, the rotor is lifted and the running clearance on the bottom will be approximately .008" to .010". The running clearance on the centerline will be about .007" and the running clearance at the top will be approximately .008" to .010".

The rotary feeder valves 33 and 35 can also be seen in FIG. 10 wherein the various mechanical drives associated with the top portion of the digester 30 are also seen. In particular, I provide a variable speed constant torque motor 96 for driving the submergence screw mechanism 36. This is electrically coupled to a similar drive 97 for the presteamer 34 and to the drive 31a for the feed screw mechanism 31 so that as resistance builds up within the digester 30, the presteamer will be slowed down proportionately. Also, it will be noted that the submergence screw mechanism 36 has a diverging flight screw 98 housed within a generally conical casing 99. This insures a wide dispersion of the chips within the digester 30 which may be as big as 16 feet in diameter. The lowest flight of the submergence screw 98 is above the liquor level and this results in generally horizontally aligning the various chips discharged from the screw before the chips encounter the impregnation liquor, the horizontal alignment facilitating straining at a subsequent stage of the digestion. Other alignments are possible by changing the configuration of the bottom flight, as, for example, V-configuration of chips. Also, the screw 98 tends to compress the various chips so as to exclude air thereby facilitating the diffusion process of the impregnation liquor.

As the chips leave the presteaming zone in which they reside for only a very short time to prevent acid hydrolysis, they enter the impregnation zone, the liquor level of which is controlled by virtue of the addition of cooling liquor through the pipe 50. The circulation liquor is substantially constant in volume and the white liquor volume is determined by the requirement of the chips so the level of the impregnation liquor is advantageously adjusted through controlling the quantity of cooling liquor introduced at the bottom of the digester 30. Further, I position the discharge ends of the white liquor pipes 41 below the lowest contemplated level of the impregnation liquor, i.e., the level 39a.

The previously referred to strainers 44 and 61 will now be described and with reference to FIGS. 11–13.

Strainers

After the chips have passed through a portion of the cooking zone, i.e., the upper portion designated 42 in FIG. 1, the chips come abreast of the upper strainers 44. The liquor to reach the strainers 44 must enter an annular chamber 101 defined by a depending skirt 100. This reverse movement of liquor at low velocity separates the liquor and chips since the chips will continue their downward progression because they are now thoroughly impregnated with liquor in which condition their specific gravity is heavier than the liquor. It will be noted that the lower ends of the circulation liquor supply pipes 45 are well above the strainers 44 so as to prevent short circuiting of the cooking liquor and insure intimate contact with the chips.

Referring now to FIG. 13, it will be seen that the strainer generally designated 44 is equipped with a supporting housing 102 equipped with bolt holes 103 for securing the same to the exterior to the digester 30. As seen in FIG. 11, the digester 30 receives bolts 104 for this purpose and the housing 102 supports a perforated baffle or plate 105 inwardly of the digester 30. Mounted for scraping engagement against the baffle 105 is a knife-like plow 106 which is fixed to a hollow shaft 107. The outer end of the shaft 107 (see FIG. 4) is equipped with a rotary seal 108 and is connected to a branch line 70a of the high pressure steam line 70. Thus, high pressure steam flows through the interior 107a of the shaft 107 and exits through slot 106a provided in the scraping means 106. The slot 106a is arranged (as seen in FIG. 12) to direct the steam against the baffle-like plate 105 and the steam thereby serves a dual purpose of purging the screen or plate 105 while heating the cooking liquor which is collected within the chamber 109 provided by the plate housing 102. As seen in FIG. 11, the plate housing 102 is equipped with an integral outlet as at 110 for coupling to the header 43 which conducts the recirculation liquor ultimately to return pipes 45.

The drive for the knife plow 106 is provided by a motor 111 (see FIG. 11) and suitable chain and sprocket drive generally designated 112.

From time to time, it may be necessary to replace the packing 113 (see FIG. 11) that is interposed between the shaft 107 and the journal 102a provided therefor by plate housing 102. When this is called for, it is only necessary to move the shaft 107 slightly inwardly, i.e., to the left in FIG. 11, so as to engage a shoulder 114 on the shaft 107 with an annular shoulder 115 provided on the plate housing 102. This effects a seal permitting the packing 113 to be removed and replaced without having to empty the digester.

Cooling zone

The cooling zone 47 is seen in enlarged form in FIG. 14 wherein the lower portion of the digester 30 is pictured. The plow 51 is seen to be equipped with radially inwardly extending nozzles 52 and axially positioned radially outwardly directed nozzles 53a. In addition, the two arms of the plow 51 are equipped with a plurality of depending paddles 116 which serve to move the cooled pulp toward the discharge 117 communicating with the discharge pipe 118. A motor 119 is provided along with a reducer 120 and reducer 121 for rotating the plow 51. The arrangement of opposed nozzles 52 and 53a insures that the now digested pulp is uniformly cooled and of uniform consistency across the entire cross-section of the digester and further, as pointed out before, the volume of cooling liquor introduced through the pipe 50 determines the liquor level at the top of the digester.

Blow valve

To remove the digested pulp from the digester 30, a blow valve is employed such as that designated 48 in FIG. 1 and which can be seen in enlarged fragmentary perspective view in FIG. 16. The valve in FIG. 16 has a body generally designated 22 providing an inlet as at 123 for the pulp. Positioned within a chamber 124 communicating with the inlet 123 is a vane-equipped rotor powered by a motor 126. The pulp enters generally axially of the rotor 125 and is discharged peripherally through an outlet 127. The chamber 124 also communicates with a reservoir as at 128 for the purpose of collecting undigested material suc has knobs, bolts, other metal pieces, etc., the reservoir 128 being equipped with a cleanout plate 128.

In certain instances I find it advantageous to go to the flow regulating blow valve assembly seen in various details in FIGS. 17-23. In FIG. 17, the digester 30 is seen equipped with a discharge pipe 188 and a modified form of blow valve designated generally by the numeral 130 and which discharges via a line 131 through a regulator 131a to a blow tank 132. For the purpose of maintaining the orifice plates clean, the valve 130 is equipped with a drive motor (see FIG. 19). The motor 133 is arranged to rotate a generally vertically extending shaft 134 positioned within a chamber 135 of the housing 136 constituting the valve 130. The housing 136 has a pulp inlet as at 137 and a pair of discharges 138 and 139 (see FIG. 18). Each discharge 138 and 139 is regulated by a means of a flow control vadve 140 and 141 respectively, still referring to FIG. 18. The valves 140 and 141 can also be seen in FIG. 121 and each valve is effective to move an associated plunger 142 (see FIG. 22) across an associated outlet passage as at 143 associated with an outlet 138. It will be noted from a consideration of FIG. 22 that the end of the plunger is of reduced section as at 144 and by comparing this with the showing in FIG. 20 it is seen that the reduced section 144 is cut away to define a concave surface 144a. Thus, when the valve plunger 142 is moved farthest to the left, i.e., closed, the configuration seen at 145 in FII. 23 results—as the plunger 142 is retracted within the valve sleeve 146 (still referring to FIG. 23), the flow passage is enlarged into an obround configuration as at 145a, 145b, etc.

To wipe the orifice-providing surfaces clean, the shaft 134 is equipped with a U-shaped impeller as at 146 (see FIG. 19) and the superposed arrangement seen in FIG. 22. One vane 147 of the impeller 146 is recessed as at 148 along the center outer edge thereof while the other vane 149 is cutaway as at 150 along the sides of the outer edge thereof. As seen in FIG. 22, this results in developing alternate wiping action along the center and edges of the passage 144a, resulting in continual cleaning of the orifice opening 145. This is especially useful when handling low solid slurries of the type involved in vertical digestion, as the same are blown through the valve 130 by the pressure from the digester.

Reference is now made to FIG. 3 which has to do with a unique arrangement for insuring uniform introduction of circulating liquor into the digester 30. In FIG. 3, it will be noted that each of the pipes 45' is telescopically received within an integral fitting 151 provided as part of the digester 30. Thus, this permits raising and lowering of the supply pipe 145 thereby regulating the level of the recirculation portion of the cooking zone 42.

While in the foregoing specification, a detailed description of an embodiment of the invention has been set down for the purpose of illustration, many variations in the details herein given may be made by those skilled in the art without departing from the spirit and scope of the invention.

I claim:

1. A continuous digester comprising an elongated chamber providing a vertical path for wood chips to be digested, means coupled to the top of said chamber for introducing wood chips thereinto, means coupled to the chamber bottom for removing a pulp slurry therefrom, means for introducing digesting liquor into said chamber adjacent the top thereof, means for steaming said chips prior to submergence in said liquor and in a high pressure steam zone, said chamber being equipped with means for introducing cooling liquor into the bottom of said chamber, control means operably associated with the chamber bottom for varying the rate of flow of liquor relative thereto to adjust the level of liquor defining the bottom of the steam zone, said chamber being equipped with strainer means intermediate the bottom of the steam zone and the bottom of said chamber to define a heating zone above the strainer means and a retention zone between the strainer means and the cooling zone provided by the introduction of said cooling liquor, said chamber further being equipped with a first plurality of vertically elongated pipes disposed across the width of said chamber and coupled to said strainer means for delivering heated liquor to said chamber above said strainer means to define the upper level of said heating zone, said pipes being sized and arranged to provide an impregnation zone above said heating zone and below said steam zone.

2. The digester of claim 1 in which said chamber is equipped with a second plurality of vertically disposed supply pipes, means coupled to said second plurality of pipes for delivering liquor thereto, said second plurality of pipes terminating a spaced distance above the first plurality of pipes to provide said liquor impregnation zone.

3. The digester of claim 1 in which said strainer means includes a screen, means for mechanically wiping said screen, and means connected with said mechanical wiping means for flowing fluid onto the said screen during wiping thereof.

4. A continuous digester comprising an elongated chamber providing a vertical path for wood chips to be digested, means coupled to the top of said chamber for introducing wood chips thereinto, means coupled to the chamber bottom for removing a pulp slurry therefrom, means for introducing digesting liquor into said chamber including a plurality of vertically disposed pipes, said chip introducing means including a rotary feeder valve, said valve being equipped with a generally cylindrical casing providing a chip inlet at the top and a bottom outlet, a pocket defining rotor rotatably mounted in said casing, said rotor having circular end plates defining labyrinthine passages when positioned adjacent said casing, and means defining an exhaust port in said casing communicating with said passages adjacent said chip inlet, said casing defining an obround chamber in which said rotor is mounted with the axis thereof being located a slight distance below the axis of the lower hemicylindrical section of the obround chamber whereby said rotor moves upwardly during digester operation with minimal clearance between the rotor and the chamber interior.

5. A rotary feeder valve comprising a generally cylindrical casing providing an inlet at the top and a bottom outlet, a pocket defining rotor rotatably mounted in said casing, said rotor having circular end plates defining labyrinthine passages when positioned adjacent said casing, and means defining an exhaust port in said casing communicating with said passages adjacent said chip inlet and in the path of said passages as they approach said inlet, said casing being equipped with a single pedestal on each end thereof for supporting said rotor, said casing additionally being equipped with an integral steam jacket whereby substantially uniform expansion due to the introduction of steam is achieved.

6. A continuous digester comprising an elongated chamber providing a vertical path for wood chips to be digested, means coupled to the top of said chamber for introducing wood chips thereinto, means coupled to the chamber bottom for removing a pulp slurry therefrom, means for introducing digesting liquor into said chamber, and means for removing recirculation liquor from said chamber for delivery to said digesting liquor introducing means, said removing means including a screen, means for mechanically wiping said screen, means connected with said mechanically wiping means for flowing fluid onto said screen during wiping thereof, said chamber being equipped with a depending skirt arranged in spaced relation to said screen whereby an annular space is developed in the digester.

7. A continuous digester comprising an elongated chamber providing a vertical path for wood chips to be digested, means coupled to the top of said chamber for introducing wood chips thereinto, means coupled to the chamber bottom for removing a pulp slurry therefrom, means for introducing digesting liquor into said chamber and means for removing recirculation liquor from said chamber for delivery to said digesting liquor introducing means, said removing means including a screen, a plow element positioned in wiping relation with said screen, and means defining a slot in said plow element for flowing fluid therein for impingement on said screen during wiping thereof.

8. A continuous digester comprising an elongated chamber providing a vertical path for wood chips to be digested, means coupled to the top of said chamber for introducing wood chips thereinto, means coupled to the chamber bottom for removing a pulp slurry therefrom, means for introducing digesting liquor into said chamber, said removing means including a valve having an impeller arranged to discharge said slurry, and a valve casing supporting said impeller and equipped with a plunger defining an adjustable outlet orifice immediately above said impeller, said impeller being generally U-shaped to define a pair of vanes, said casing having an annular groove in which said vanes are movably positioned, said groove having a generally rectangular shaped radial section, one of said vanes being relieved along the edges to sweep through the central portion of said section, the other of said vanes being relieved along the central part thereof to sweep through the corner portions of said section.

References Cited

UNITED STATES PATENTS

| | | | |
|---|---|---|---|
| 798,523 | 8/1905 | McIntyre | 162—251 |
| 2,474,862 | 7/1949 | Richter | 162—237 X |
| 2,766,911 | 10/1956 | Greaves et al. | 222—368 X |
| 2,803,540 | 8/1957 | Durant et al. | 162—246 X |
| 2,993,537 | 7/1961 | Green | 162—246 X |
| 3,097,987 | 7/1963 | Sloman | 162—237 X |
| 3,201,007 | 8/1965 | Transeau | 222—368 X |
| 3,215,588 | 11/1965 | Kleinert | 162—19 |
| 3,298,899 | 1/1967 | Laakso | 162—237 X |

FOREIGN PATENTS

| | | |
|---|---|---|
| 559,491 | 7/1958 | Canada. |
| 692,155 | 8/1964 | Canada. |
| 1,022,903 | 12/1952 | France. |
| 1,229,425 | 3/1960 | France. |

S. LEON BASHORE, *Primary Examiner.*

U.S. Cl. X.R.

162—19, 238, 246, 251; 222—368, 411